(12) United States Patent
Mikhaylov et al.

(10) Patent No.: US 10,437,280 B2
(45) Date of Patent: *Oct. 8, 2019

(54) CONTROLLING SYSTEM CLOCKS IN VIRTUAL MACHINES

(71) Applicant: INTERNATIONAL BUSINESS MACHINES CORPORATION, Armonk, NY (US)

(72) Inventors: Ivan Mikhaylov, Chelyabinsk (RU); Ivan Mironov, Moscow (RU); Petr Petrov, Moscow (RU)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/976,237

(22) Filed: May 10, 2018

(65) Prior Publication Data

US 2018/0259997 A1 Sep. 13, 2018

Related U.S. Application Data

(63) Continuation of application No. 15/195,842, filed on Jun. 28, 2016, now Pat. No. 10,054,978, which is a continuation of application No. 15/141,129, filed on Apr. 28, 2016, now Pat. No. 10,054,977.

(51) Int. Cl.
| | |
|---|---|
| *G06F 1/12* | (2006.01) |
| *G06F 9/44* | (2018.01) |
| *G06F 9/52* | (2006.01) |
| *G06F 9/455* | (2018.01) |

(52) U.S. Cl.
CPC ............ *G06F 1/12* (2013.01); *G06F 9/45558* (2013.01); *G06F 9/52* (2013.01); *G06F 2009/45575* (2013.01); *G06F 2009/45579* (2013.01)

(58) Field of Classification Search
CPC .......... G06F 1/12; G06F 9/45558; G06F 9/52
See application file for complete search history.

(56) References Cited

U.S. PATENT DOCUMENTS

| | | |
|---|---|---|
| 7,739,532 B2 | 6/2010 | Grobman |
| 8,086,890 B2 | 12/2011 | Song |
| 8,191,062 B2 | 5/2012 | Grobman |
| 8,627,133 B2 | 1/2014 | Tsirkin et al. |
| 9,110,698 B2 | 8/2015 | Nicholas et al. |
| 9,344,265 B2 | 5/2016 | Karnes |

(Continued)

OTHER PUBLICATIONS

Mell, Peter, et at, "The NIST Definition of Cloud Computing", NIST Special Publication 800-145, Sep. 2011, Gaithersburg, MD, 7 pgs.

(Continued)

*Primary Examiner* — Stefan Stoynov
(74) *Attorney, Agent, or Firm* — William Kinnaman; Matthew M. Hulihan; Heslin Rothenberg Farley & Mesiti PC

(57) ABSTRACT

Managing system clocks of virtual machines. A host system clock value of a host system clock of a host system is obtained, and a virtual machine system clock value of a system clock of a virtual machine managed by the host system is determined. The determining of the virtual machine system clock value includes using the host system clock value and a system clock adjustment value. The system clock of the virtual machine is adjusted using the virtual machine system clock value.

10 Claims, 9 Drawing Sheets

(56) References Cited

U.S. PATENT DOCUMENTS

2007/0033589 A1    2/2007   Nicholas et al.
2012/0159138 A1    6/2012   Tsirkin et al.
2014/0245069 A1    8/2014   Hu et al.
2017/0315581 A1   11/2017   Mikhaylov et al.
2017/0315834 A1   11/2017   Mikhaylov et al.

OTHER PUBLICATIONS

IBM, "z/Architecture—Principles of Operation," IBM Publication No: SA22-7832-10, Eleventh Edition, Mar. 2015, pp. 1-1732.
IBM, "Power ISA, User instruction Set Architecture—V2.07B," Apr. 9, 2015, pp. 1-1496.
List of IBM Patents or Patent Applications Treated as Related, May 10, 2018, pp. 1-2.
Office Action in U.S. Appl. No. 15/141,129 dated Oct. 4, 2017.
Final Office Action in U.S. Appl. No. 15/141,129 dated Feb. 2, 2018.
Notice of Allowance in U.S. Appl. No. 15/141,129 dated Apr. 23, 2018.
Office Action in U.S. Appl. No. 15/195,842 dated Oct. 2, 2017.
Final Office Action in U.S. Appl. No. 15/195,842 dated Feb. 1, 2018.
Notice of Allowance in U.S. Appl. No. 15/195,842 dated Apr. 18, 2018.
"Controlling System Clocks in Virtual Machines", U.S. Appl. No. 15/976,273, filed May 10, 2018, pp. 1-36.

CONTROLLING SYSTEM CLOCKS IN VIRTUAL MACHINES

BACKGROUND

One or more aspects relate, in general, to virtual computing environments, and in particular, to processing within virtual machines of virtual computing environments.

Virtual machines of a virtual computing environment execute processes that perform certain tasks. Some of the processes may even communicate between one another. To successfully communicate with one another, interprocess communication (IPC) timing is to be at a rate in which the processes may communicate with one another.

Further, within such environments, debug tools may be used to detect errors or other issues, such as programming bugs, memory leaks, etc. However, the use of such debug tools may negatively affect performance of a process, and thus, effect the timing between processes.

SUMMARY

Shortcomings of the prior art are overcome and additional advantages are provided through the provision of a computer-implemented method of managing system clocks of a computing environment. The method includes, in one embodiment, obtaining a host system clock value of a host system clock of a host system; determining a virtual machine system clock value of a system clock of a virtual machine managed by the host system, wherein the determining comprises using the host system clock value and a system clock adjustment value to determine the virtual machine system clock value; and adjusting the system clock of the virtual machine using the virtual machine system clock value.

Computer program products and systems relating to one or more aspects are also described and claimed herein. Further, services relating to one or more aspects are also described and may be claimed herein.

Additional features and advantages are realized through the techniques described herein. Other embodiments and aspects are described in detail herein and are considered a part of the claimed aspects.

BRIEF DESCRIPTION OF THE DRAWINGS

One or more aspects are particularly pointed out and distinctly claimed as examples in the claims at the conclusion of the specification. The foregoing and objects, features, and advantages of one or more aspects are apparent from the following detailed description taken in conjunction with the accompanying drawings in which:

DETAILED DESCRIPTION

In accordance with one or more aspects of the present invention, a system clock of a virtual machine is managed. As an example, the system clock is regulated in order to compensate for, e.g., a slowdown of a process executing in the virtual machine due to processing in a particular processing mode, such as debug mode. This may facilitate interprocess communication with other processes, such as those executing in another processing mode, such as a usual or non-debug mode. The speed of execution of the processes executing in one or more virtual machines in different processing modes (e.g., debug mode and usual mode) is synchronized by managing one or more virtual clocks to enable interaction between the processes.

One example of a computing environment that includes virtual machines and uses a system clock control facility to control the system clock of one or more of the virtual machines is described with reference to FIG. 1

Figure 1:
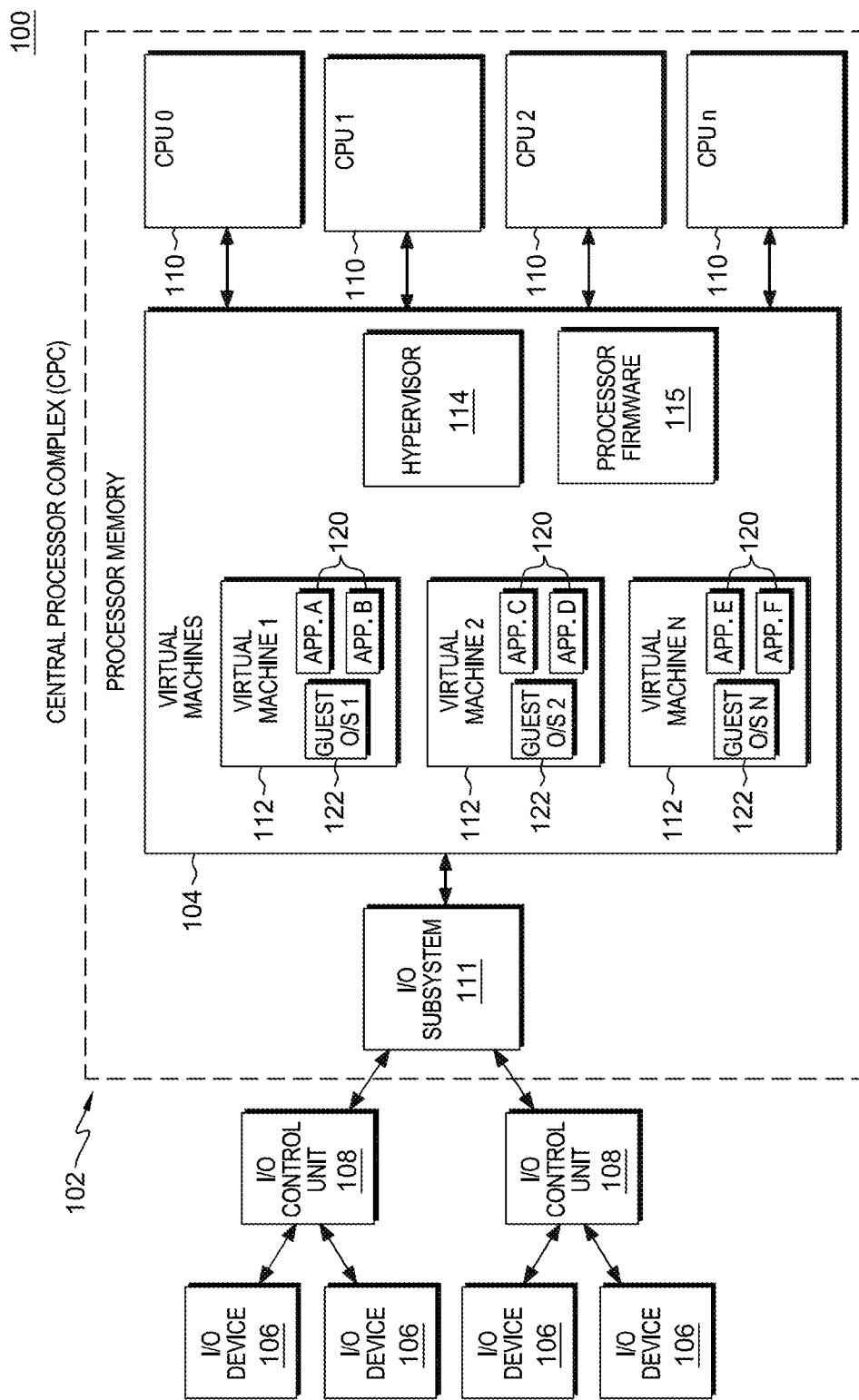
FIG. 1 depicts one example of a computing environment to incorporate and use one or more aspects of the present invention.

Referring to FIG. 1, in one example, a computing environment 100 is based on the z/Architecture, offered by International Business Machines (IBM®) Corporation, Armonk, N.Y. The z/Architecture is described in an IBM Publication entitled "z/Architecture—Principles of Operation," Publication No. SA22-7832-10, 11$^{th}$ Edition, March 2015, which is hereby incorporated by reference herein in its entirety. Z/ARCHITECTURE, IBM, Z/VM and Z/OS (referenced herein) are registered trademarks of International Business Machines Corporation, Armonk, N.Y. Other names used herein may be registered trademarks, trademarks or product names of International Business Machines Corporation or other companies.

In another example, the computing environment is based on the Power Architecture, offered by International Business Machines Corporation, Armonk, N.Y. One embodiment of the Power Architecture is described in "Power ISA™ Version 2.07B," International Business Machines Corporation, Apr. 9, 2015, which is hereby incorporated herein by reference in its entirety. POWER ARCHITECTURE® is a registered trademark of International Business Machines Corporation, Armonk, N.Y., USA.

The computing environment may be based on other architectures, as well. The examples provided herein are not meant to be limiting and are just provided as examples.

Computing environment 100 includes a central processor complex 102 providing virtual machine support. CPC 102 is coupled to one or more input/output (I/O) devices 106 via one or more control units 108. Central processor complex 102 includes, for instance, a processor memory 104 (a.k.a., main memory, main storage, central storage) coupled to one or more central processors (a.k.a., central processing units (CPUs)) 110, and an input/output subsystem 111, each of which is described below.

Processor memory 104 includes, for example, one or more virtual machines 112, a virtual machine manager, such as a hypervisor 114 that manages the virtual machines, and processor firmware 115. One example of hypervisor 114 is z/VM®, offered by International Business Machines Corporation, Armonk, N.Y. The hypervisor is sometimes referred to as the host. Further, as used herein, firmware includes, e.g., the microcode and/or millicode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

The virtual machine support of the CPC provides the ability to operate large numbers of virtual machines 112, each capable of operating with different programs 120 and running a guest operating system 122, such as Linux. Each virtual machine 112 is capable of functioning as a separate system. That is, each virtual machine can be independently reset, run a guest operating system, and operate with different programs. An operating system or application program running in a virtual machine appears to have access to a full and complete system, but in reality, only a portion of it is available.

Processor memory 104 is coupled to central processors (CPUs) 110, which are physical processor resources assignable to virtual machines. For instance, virtual machine 112 includes one or more logical processors, each of which represents all or a share of a physical processor resource 110 that may be dynamically allocated to the virtual machine.

Further, processor memory 104 is coupled to an I/O subsystem 111. Input/output subsystem 111 directs the flow of information between input/output devices 106 and main storage 104. It is coupled to the central processing complex, in that it can be a part of the central processing complex or separate therefrom.

Figure 2:
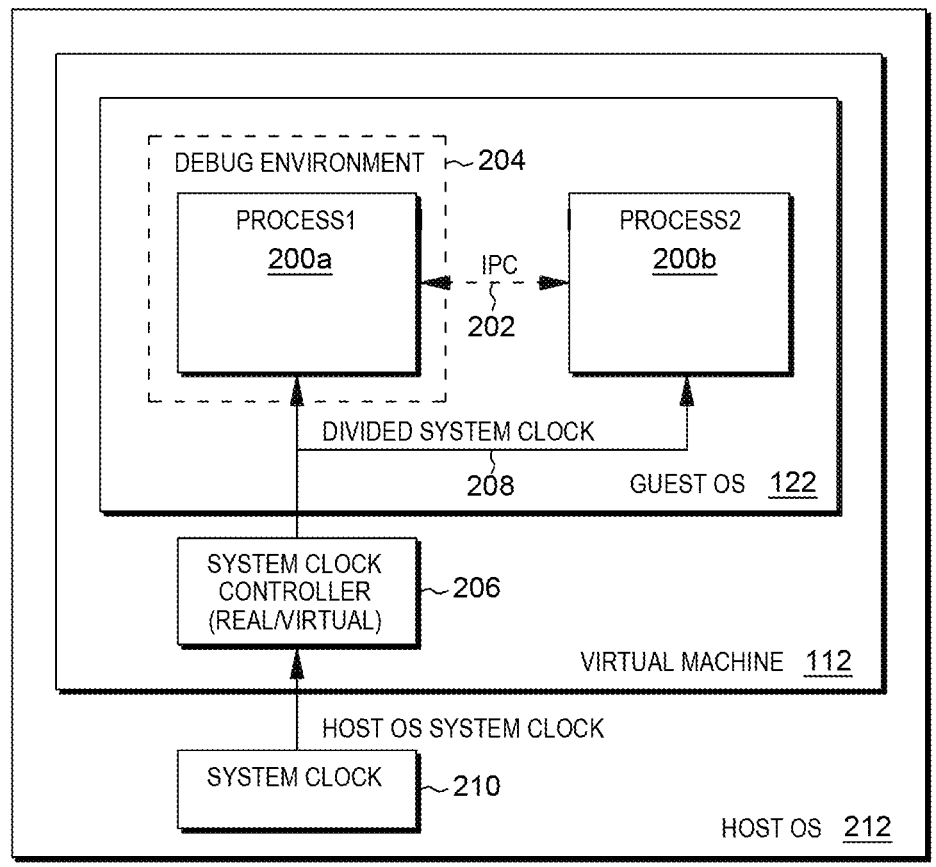
FIG. 2 depicts one example of further details of aspects of the computing environment of FIG. 1, in accordance with an aspect of the present invention.

Further details regarding a virtual machine are described with reference to FIG. 2. As shown in one example, a virtual machine 112 executes a guest operating system 122, which manages one or more processes 200a, 200b. The processes, in this example, communicate with one another via an interprocess communication (IPC) 202. Further, in this particular example, process 200a is being debugged in a debug environment 204, such as Valgrind, available under a GNU General Public License, and process 200b is executing in a non-debug mode, also referred to herein as a usual mode.

In debug mode, processing is typically slower. For instance, with reference to FIG. 3, assume that a process executes a set of actions (1 . . . N) 300 during 1 second 302 in usual or non-debug mode. If the process is placed in debug mode, it executes a significantly less number of actions, as shown at 304.

Returning to FIG. 2, virtual machine 112 further includes a system clock controller 206, which provides a system clock 208 divided among the processes. Input to system clock controller 206 is a system clock 210 provided for a host control program, e.g., host operating system, 212 managing execution of virtual machine 112. System clock 210 may be referred to as a host system clock.

Figure 3:
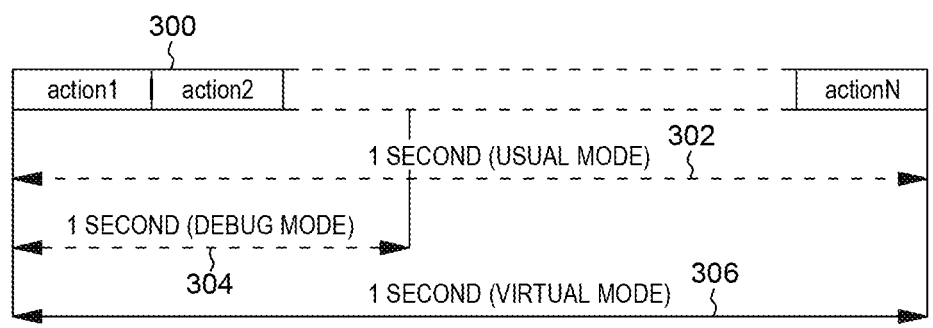
FIG. 3 depicts one example of timing of actions, in accordance with an aspect of the present invention.

By dividing the system clock of the host machine, the time on a virtual machine is stretched to allow processes to execute all the actions that they would have in usual mode, as shown, for instance, in FIG. 3 at 306.

Figure 4:
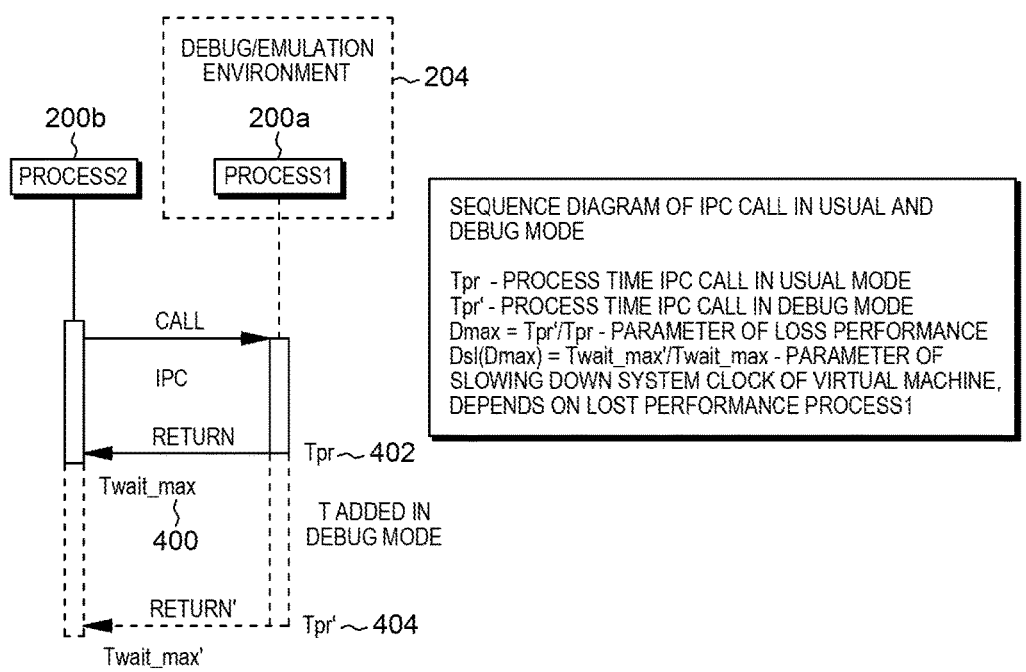
FIG. 4 depicts one example of a sequence diagram depicting interprocess communication in debug mode and non-debug mode, in accordance with an aspect of the present invention.

Additional details of interprocess communication between process 200a, also referred to herein as Process1, and process 200b, also referred to herein as Process2, are described with reference to FIG. 4. Process2 performs a remote call to Process1 and waits a response during Twait_max 400. The processing of the remote call in non-debug mode takes time Tpr 402. In debug mode, it takes additional time (Tpr' 404), and accordingly, errors appear in the interprocess communication. To quantify the loss of performance, a ratio is calculated: Dmax=Tpr'/Tpr.

Thus, in accordance with an aspect of the present invention, a system clock adjustment value, Ds1, is determined and used to slow down (stretch time) the system clock in a virtual machine to synchronize the processes. In one example, Ds1 (Dmax)=Twait_max'/Twait_max, where Twait_max' is a stretched maximum wait time (measured, e.g., in host OS seconds). Ds1 is adjusted during calibration, as described below.

Calibration includes, for instance, measuring the lost performance and performing a calibration process to determine an adjusted (e.g., calibrated) slowing down clock value (Dmin). For measuring the lost performance, one or more functional tests are used. The tests depend on a user task and it can be the software itself or a set of isolated operation/actions in accordance with task complexity. It is defined as f( ). The maximum value of debug/non-debug function processing time is Dmax.

The calibration process determines, for instance, a Dmin coefficient, in which Dmin is a minimum when the software is working well. Input data to the calibration process includes, for example: [1, Dmax], which is a divider range for the calibration process; f(D), which is a functional test, where D is the effective coefficient of time slowing within a virtual machine; and C is a divider's time safety factor after calibration [0,1], which is set by the user. The criterion of sufficiency of slowing down the time depends on the task. In one example, with f(D)=0 time slowing is insufficient; with f(D)>0, the coefficient is sufficient.

During calibration, an attempt is made to find out the minimal coefficient of time slowing (Dmin) with which f(D)>0. For this, in one example, a bisection technique for f(D) on segment [1, Dmax] is used. The calibration is successful when the result is greater than zero of k functional tests, f(D)1 . . . k>0. The lowest value of D is Dmin.

The C coefficient is used for the correlation process of Dmin in order to pinpoint more precisely to provide a smooth performance on the machine. Ds1 is a final evaluation of Dmin which may be used to increase performance. A coefficient correction with a divider's time safety factor (C) includes, for instance:

$$Ds1=Dmin+C*(Dmax-Dmin).$$

The output of the process includes, for example, the C, Dmin, and Ds1 coefficients. Dmin is the adjusted (calibrated) system clock slowing down value calculated during the calibration process. Ds1 may be equal to Dmin in the cases when the user does not want to maximize performance of the machine in which the software is running.

Figure 5:
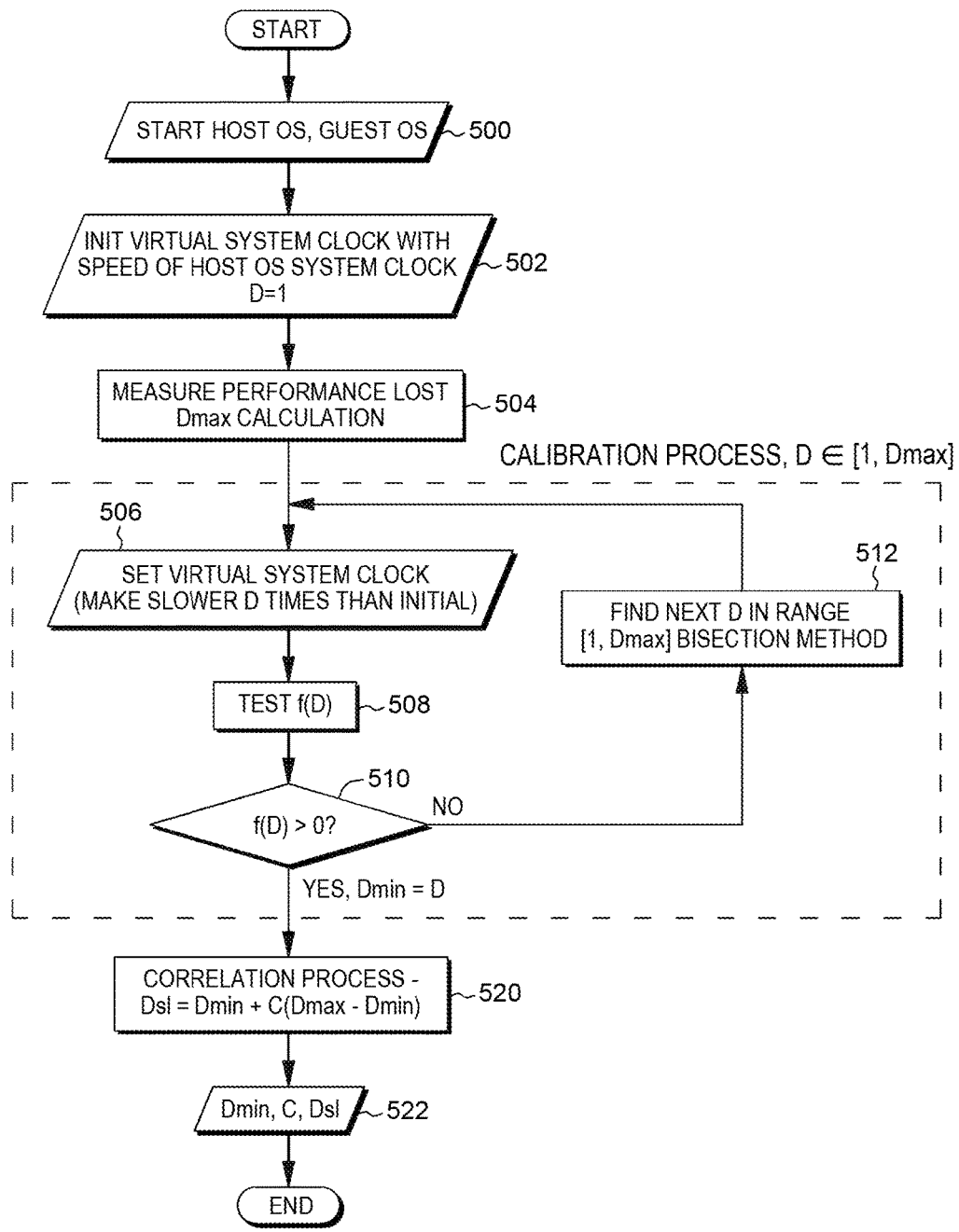
FIG. 5 depicts one embodiment of logic to determine a system clock adjustment value used in accordance with one or more aspects of the present invention.

Further details regarding the calibration process are described with reference to FIG. 5. Initially, the host operating system and the guest operating system are started, STEP 500. The system clock of the virtual machine (also referred to herein as the virtual system clock) is initialized with the speed of the host system clock, and a variable, D, is set equal to one, STEP 502. The performance lost is measured by calculating Dmax, STEP 504, as described above. For instance, Dmax equals a time to perform a functional test in debug mode divided by the time to perform the functional test in non-debug mode.

The calibration process is performed, which includes the following steps, as an example. In STEP 506, the virtual system clock of a selected virtual machine is set. In one example, the virtual system clock is set slower D times the initial setting of the virtual system clock. Further, a test f(D) is performed, STEP 508. If a result of f(D) is not a particular relationship (e.g., greater than) with respect to a particular value (e.g., 0), INQUIRY 510, then the next D in the range of [1, Dmax] is selected by, for instance, a bisection technique, STEP 512, and processing continues with STEP 506. However, if the result of f(D) has the particular relationship with respect to the particular value (e.g., is greater than zero), INQUIRY 510, then the calibration process is complete (Dmin—the adjusted system clock slowing down value—is calculated), and processing proceeds to a correlation process.

During correlation, the system clock adjustment value, Ds1, is calculated. For example: Ds1=Dmin+C*(Dmax−Dmin), STEP 520. Thereafter, the output of the process is C, Dmin and Ds1, STEP 522. In other embodiments, C is not used.

One embodiment of using the system clock adjustment value, Ds1, to adjust the system clock of the virtual machine is described with reference to FIG. 6. In one example, this logic is performed by one or more processors of the virtual machine. It may be performed by a system clock controller of the virtual machines.

Figure 6:
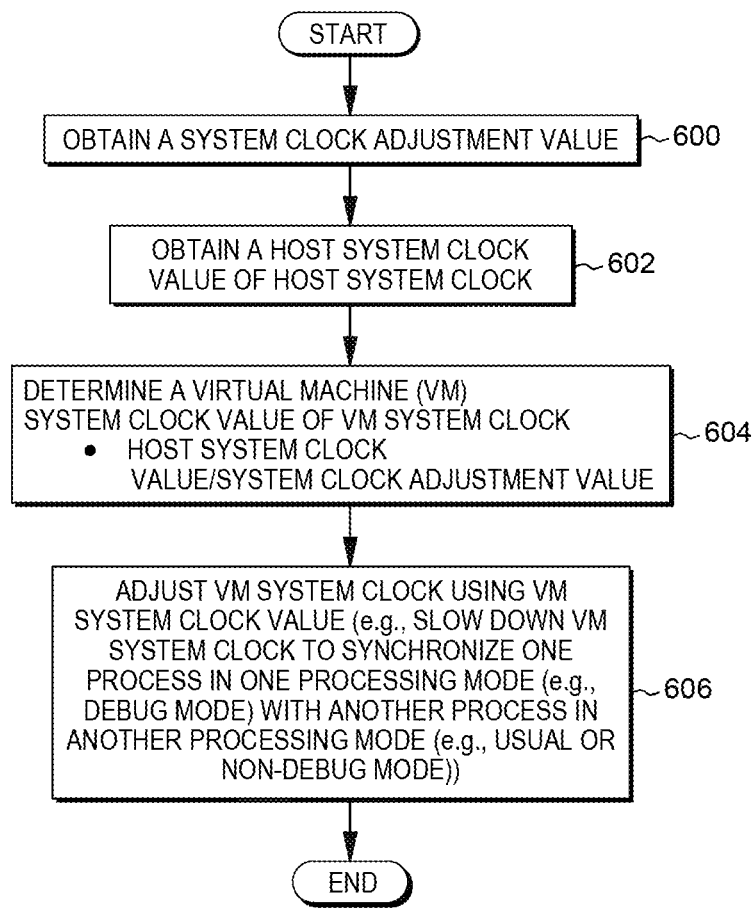
FIG. 6 depicts one example of logic to control system clocks in virtual machines, in accordance with an aspect of the present invention.

Referring to FIG. 6, a system clock adjustment value, Ds1, is obtained, STEP 600. The system clock adjustment value is determined, as described above, in one example. Further, a clock value (e.g., frequency) of a host system clock is obtained, STEP 602. In one example, this host system clock value is obtained by a system controller communicatively coupled to the host system and the virtual machine.

The host system clock value and the system clock adjustment value are used to determine a virtual machine system clock value (e.g., frequency) of a system clock of the virtual machine, STEP 604. For instance, the virtual machine system clock value is set equal to the host system clock value divided by the system clock adjustment value.

The virtual machine system clock value is used to adjust the system clock of the virtual machine, STEP 606. For instance, the virtual machine system clock value is used to slow down the virtual machine system clock to synchronize processes executing on the virtual machine. As a particular example, one process executing on the virtual machine in one processing mode (e.g., debug mode) is synchronized with another process executing on the virtual machine in another processing mode (e.g., non-debug or usual mode) to enable the processes to communicate with one another.

As described above, a system clock is managed on a virtual machine. The coefficient of slowing the clock is calculated by a calibration step, and the speed of executing processes in debug mode and usual mode are synchronized to enable interaction between the processes. This allows the debugging of complicated software of processes executing in different environments and performing interprocess communication.

Although, in the examples herein, the processes to be synchronized are executing on one virtual machine, in other embodiments, they may be executing on one or more virtual machines.

Figure 7A:
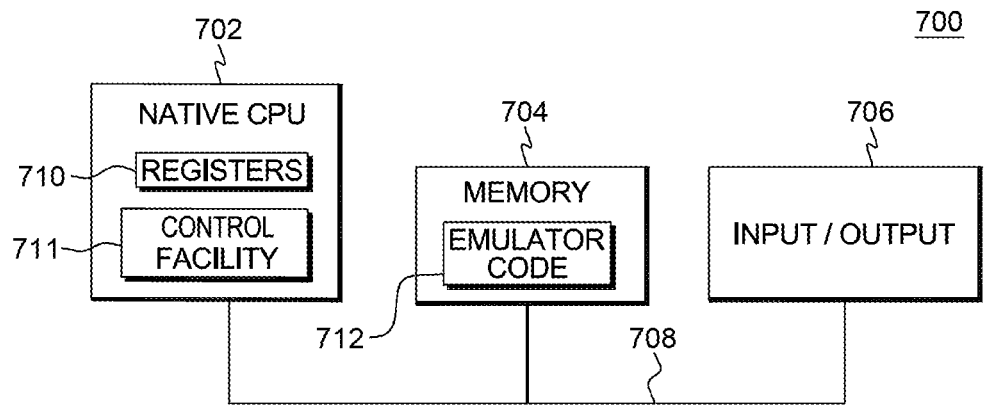
FIG. 7A depicts another example of a computing environment to incorporate and/or use one or more aspects of the present invention.

Another example of a computing environment to incorporate and use one or more aspects of the system clock control facility is described with reference to FIG. 7A. In this example, a computing environment 700 includes, for instance, a native central processing unit (CPU) 702, a memory 704, and one or more input/output devices and/or interfaces 706 coupled to one another via, for example, one or more buses 708 and/or other connections. As examples, computing environment 700 may include a zSeries server, a PowerPC processor or a Power Systems server offered by International Business Machines Corporation, Armonk, N.Y.; an HP Superdome with Intel Itanium II processors offered by Hewlett Packard Co., Palo Alto, Calif.; and/or other machines based on architectures offered by International Business Machines Corporation, Hewlett Packard, Intel, Oracle, or others.

Native central processing unit 702 includes one or more native registers 710, such as one or more general purpose registers and/or one or more special purpose registers used during processing within the environment, as well as a system clock control facility 711. These registers include information that represents the state of the environment at any particular point in time.

Moreover, native central processing unit 702 executes instructions and code that are stored in memory 704. In one particular example, the central processing unit executes emulator code 712 stored in memory 704. This code enables the computing environment configured in one architecture to emulate one or more other architectures. For instance, emulator code 712 allows machines based on architectures other than the z/Architecture, such as PowerPC processors, Power Systems servers, HP Superdome servers or others, to emulate the z/Architecture and to execute software and instructions developed based on the z/Architecture.

Figure 7B:
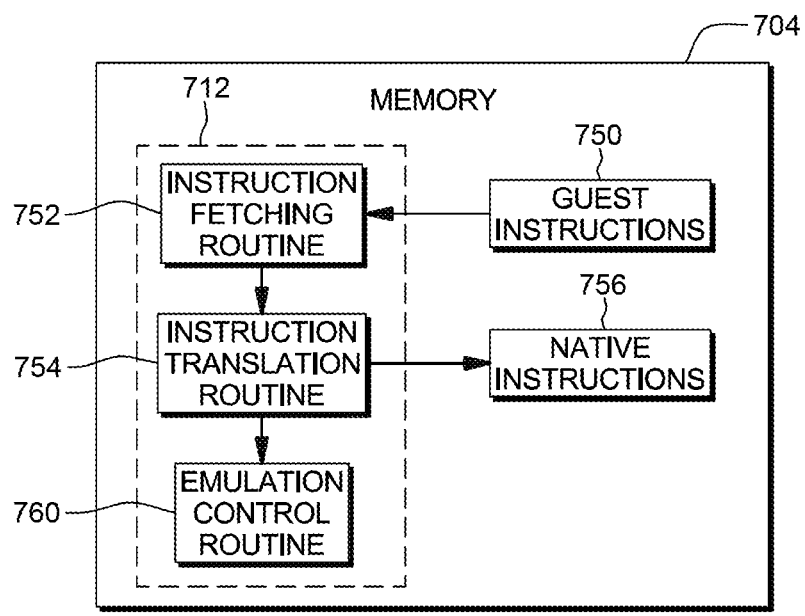
FIG. 7B depicts further details of the memory of FIG. 7A, in accordance with an aspect of the present invention.

Further details relating to emulator code 712 are described with reference to FIG. 7B. Guest instructions 750 stored in memory 704 comprise software instructions (e.g., correlating to machine instructions) that were developed to be executed in an architecture other than that of native CPU 702. For example, guest instructions 750 may have been designed to execute on a z/Architecture processor, but instead, are being emulated on native CPU 702, which may be, for example, an Intel Itanium II processor. In one example, emulator code 712 includes an instruction fetching routine 752 to obtain one or more guest instructions 750 from memory 704, and to optionally provide local buffering for the instructions obtained. It also includes an instruction translation routine 754 to determine the type of guest instruction that has been obtained and to translate the guest instruction into one or more corresponding native instructions 756. This translation includes, for instance, identifying the function to be performed by the guest instruction and choosing the native instruction(s) to perform that function.

Further, emulator code 712 includes an emulation control routine 760 to cause the native instructions to be executed. Emulation control routine 760 may cause native CPU 702 to execute a routine of native instructions that emulate one or more previously obtained guest instructions and, at the conclusion of such execution, return control to the instruction fetch routine to emulate the obtaining of the next guest instruction or a group of guest instructions. Execution of the native instructions 756 may include loading data into a register from memory 704; storing data back to memory from a register; or performing some type of arithmetic or logic operation, as determined by the translation routine.

Each routine is, for instance, implemented in software, which is stored in memory and executed by native central processing unit 702. In other examples, one or more of the routines or operations are implemented in firmware, hardware, software or some combination thereof. The registers of the emulated processor may be emulated using registers 710 of the native CPU or by using locations in memory 704. In embodiments, guest instructions 750, native instructions 756 and emulator code 712 may reside in the same memory or may be disbursed among different memory devices.

One or more aspects may relate to cloud computing.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Figure 8:
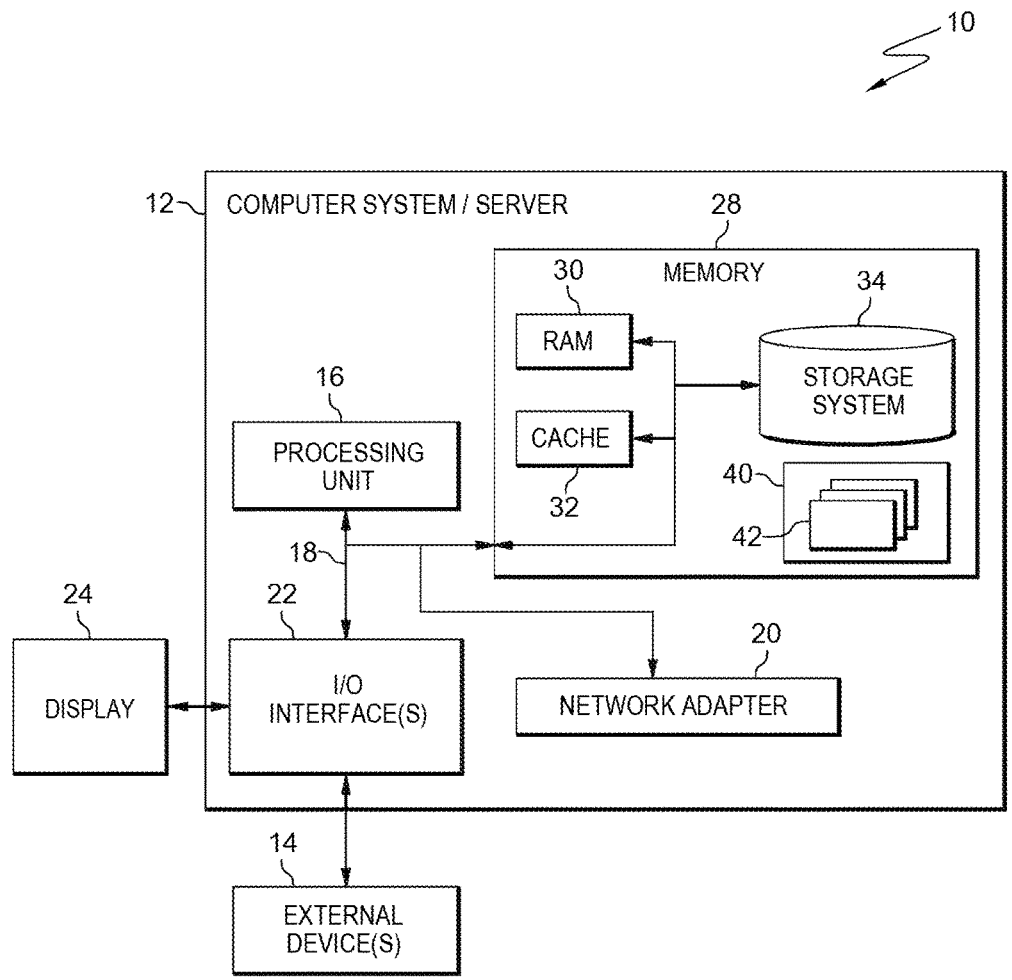
FIG. 8 depicts one embodiment of a cloud computing node.

Referring now to FIG. 8, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 9:
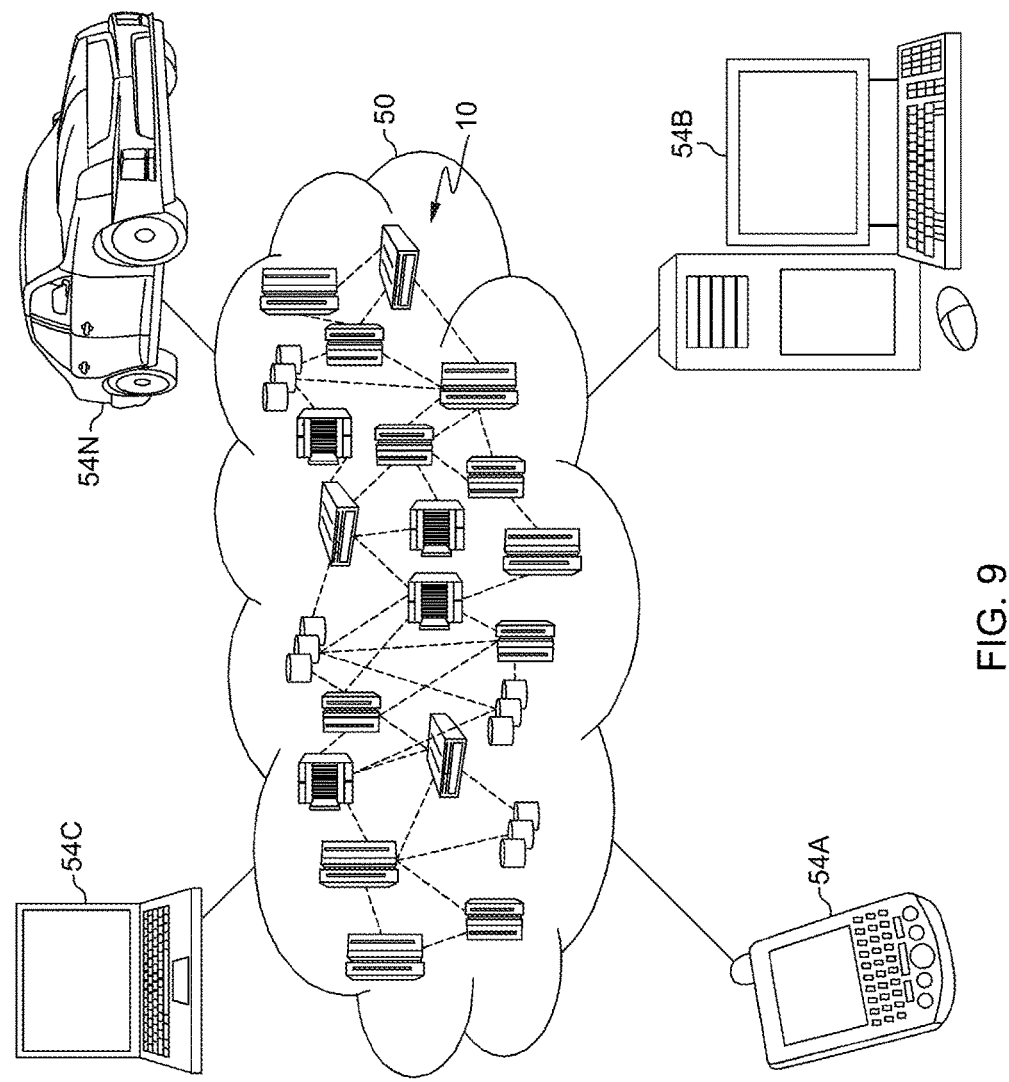
FIG. 9 depicts one embodiment of a cloud computing environment.

Referring now to FIG. 9, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Figure 10:
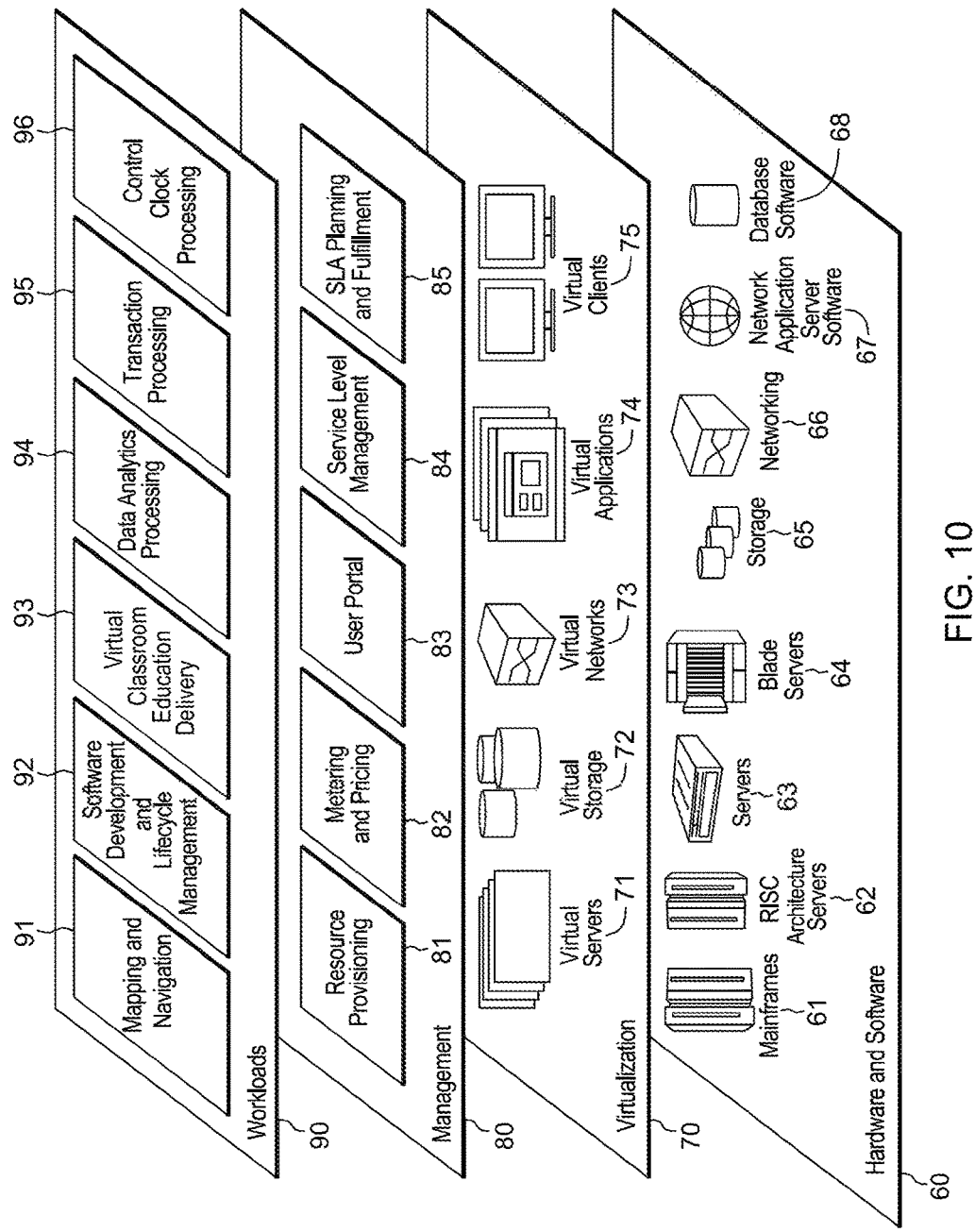
FIG. 10 depicts one example of abstraction model layers.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and system clock control processing 96.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, other techniques for determining the system clock adjustment value and/or other values may be used. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer-implemented method of managing system clocks of a computing environment, said computer-implemented method comprising:
    obtaining a host system clock value of a host system clock of a host system;
    determining a system clock adjustment value, the determining the system clock adjustment value comprising:
        determining a loss of performance value using one process time for a process executing in one processing mode and another process time for the process executing in another processing mode;
        determining an adjusted system clock slowing down value; and
        using the loss of performance value and the adjusted system clock slowing down value to determine the system clock adjustment value;
    determining a virtual machine system clock value of a system clock of a virtual machine managed by the host system, wherein the determining comprises using the host system clock value and the system clock adjustment value to determine the virtual machine system clock value; and
    adjusting the system clock of the virtual machine using the virtual machine system clock value.

2. The computer-implemented method of claim 1, wherein the determining the virtual machine system clock value comprises dividing the host system clock value by the system clock adjustment value to determine the virtual machine system clock value.

3. The computer-implemented method of claim 1, wherein the using the loss of performance value and the adjusted system clock slowing down value to determine the system clock adjustment value comprises performing a calculation.

4. The computer-implemented method of claim 3, wherein the calculation is a function of the adjusted system clock slowing down value, a time safety factor, the loss of performance value, and the adjusted system clock slowing down value.

5. The computer-implemented method of claim 4, wherein the calculation comprises: system clock adjustment value=the adjusted system clock slowing down value+a time safety factor*(the loss of performance value−the adjusted system clock slowing down value).

6. The computer-implemented method of claim 1, wherein the determining the loss of performance value uses one or more functional tests.

7. The computer-implemented method of claim 1, wherein the determining the adjusted system clock slowing down value uses one or more functional tests.

8. The computer-implemented method of claim 7, wherein the determining the adjusted system clock slowing down value comprises:
    setting the system clock of the virtual machine to one value;
    performing a functional test using a selected value;
    determining whether a result of the functional test is a particular relationship with respect to a particular value; and
    performing an action, based on the determining.

9. The computer-implemented method of claim 8, wherein the performing the action comprises, based on the result of the functional test not having the particular relationship with respect to the particular value: selecting another selected value and repeating the performing the functional test, the determining whether the result of the functional test is the particular relationship with respect to the particular value, and the performing the action.

10. The computer-implemented method of claim 8, wherein the performing the action comprises, based on the result of the functional test having the particular relationship with respect to the particular value, setting the adjusted system clock slowing down value to the selected value.

* * * * *